United States Patent
Quindt (10) Patent No.: US 6,808,222 B2
(45) Date of Patent: Oct. 26, 2004

(54) CONVERTIBLE VEHICLE

(75) Inventor: Reinhard Quindt, Farmington Hills, MI (US)

(73) Assignees: Wilhelm Karmann GmbH, Osnabrück (DE); ASC Incorporated, Southgate, MI (US)

( * ) Notice: Subject to any disclaimer, the term of this patent is extended or adjusted under 35 U.S.C. 154(b) by 0 days.

(21) Appl. No.: 10/222,198

(22) Filed: Aug. 17, 2002

(65) Prior Publication Data

US 2003/0034668 A1 Feb. 20, 2003

(30) Foreign Application Priority Data

Aug. 17, 2001 (DE) .......................................... 101 39 354

(51) Int. Cl.⁷ ................................................. B60J 7/00
(52) U.S. Cl. ............. 296/108; 296/107.17; 296/107.08; 296/117
(58) Field of Search ........................... 296/108, 107.08, 296/221, 223, 107.17, 107.01, 213

(56) References Cited

U.S. PATENT DOCUMENTS

| | | | | |
|---|---|---|---|---|
| 2,939,742 A | * | 6/1960 | Dardarin et al. ............ | 296/108 |
| 3,575,464 A | * | 4/1971 | Himka et al. ................ | 296/117 |
| 4,796,943 A | * | 1/1989 | Fukutomi et al. ...... | 296/107.17 |
| 5,265,930 A | * | 11/1993 | Klein et al. ............ | 296/107.17 |
| 5,520,432 A | * | 5/1996 | Gmeiner et al. ............ | 296/108 |
| 5,746,470 A | * | 5/1998 | Seel et al. .................... | 296/108 |
| 5,769,483 A | * | 6/1998 | Danzl et al. ................. | 296/108 |
| 5,833,300 A | * | 11/1998 | Russke ........................ | 296/108 |
| 5,979,970 A | * | 11/1999 | Rothe et al. ............ | 296/107.17 |
| 6,010,178 A | * | 1/2000 | Hahn et al. ............ | 296/107.08 |
| 6,019,416 A | * | 2/2000 | Beierl .................... | 296/107.17 |
| 6,039,383 A | * | 3/2000 | Jambor et al. ............... | 296/108 |
| 6,053,560 A | * | 4/2000 | Rothe .......................... | 296/108 |
| 6,062,625 A | * | 5/2000 | Elelnrieder et al. ......... | 296/108 |
| 6,131,988 A | * | 10/2000 | Queveau et al. ............. | 296/108 |
| 6,293,605 B2 | * | 9/2001 | Neubrand .................... | 296/108 |
| 6,299,234 B1 | * | 10/2001 | Seel et al. .................... | 296/108 |
| 6,312,042 B1 | * | 11/2001 | Halbweiss et al. .......... | 296/108 |
| 6,315,349 B1 | * | 11/2001 | Kinnanen .................... | 296/108 |
| 6,336,673 B1 | * | 1/2002 | Rothe et al. ................. | 296/108 |
| 6,347,828 B1 | * | 2/2002 | Rapin et al. ................. | 296/108 |
| 6,382,703 B1 | * | 5/2002 | Queveau et al. ............. | 296/108 |
| 6,390,532 B1 | * | 5/2002 | Mac Farland ............... | 296/108 |
| 6,419,296 B2 | * | 7/2002 | Dintner et al. .............. | 296/108 |
| 6,425,621 B2 | * | 7/2002 | Miklosi et al. .............. | 296/108 |
| 6,431,636 B1 | * | 8/2002 | Schutt ......................... | 296/108 |
| 6,478,362 B2 | * | 11/2002 | Obendiek .................... | 296/108 |
| 6,481,781 B2 | * | 11/2002 | Bergerhoff et al. ......... | 296/108 |
| 6,497,447 B1 | * | 12/2002 | Willard ....................... | 296/108 |
| 6,502,891 B2 | * | 1/2003 | Russke ........................ | 296/108 |
| 6,502,892 B2 | * | 1/2003 | Eberle ......................... | 296/108 |
| 6,505,881 B2 | * | 1/2003 | Kinnanen .................... | 296/108 |
| 6,540,280 B2 | * | 4/2003 | Tamura et al. ............... | 296/108 |
| 2002/0030381 A1 | * | 3/2002 | Schutt et al. ................ | 296/108 |
| 2002/0171258 A1 | * | 11/2002 | Obendiek .................... | 296/108 |
| 2002/0185886 A1 | * | 12/2002 | Obendiek .................... | 296/108 |
| 2003/0020299 A1 | * | 1/2003 | Bauer et al. ................. | 296/108 |
| 2003/0034668 A1 | * | 2/2003 | Quindt ........................ | 296/108 |

* cited by examiner

*Primary Examiner*—Kiran Patel
(74) *Attorney, Agent, or Firm*—Friedrich Kueffner (57) ABSTRACT

A convertible vehicle (1) with a roof (4) consisting of at least two parts, comprising a rear roof part (6) and a roof part (5) which is in the forward position when the roof is closed, where, when the roof is open, the rear roof part (6) is essentially vertical and the roof part (5) in the forward position with respect to the direction of travel (F) is essentially parallel to the rear part, is designed in such a way that a common drive (14), one of which is on each side of the vehicle, is used to move both the rear roof part (6) and the roof part (5) in front to open and close the roof (4).

12 Claims, 14 Drawing Sheets

CONVERTIBLE VEHICLE

BACKGROUND OF THE INVENTION

1. Field of the Invention

The invention pertains to a convertible vehicle and to pickup vehicle.

2. Description of the Related Art

It is known from DE 199 30 616 C1 that a convertible vehicle with a two-part, solid roof can be designed so that the roof parts can be telescoped into each other and stowed away. The rear roof part, which includes the rear window, can be pivoted around a circular path and stowed after it has been rotated about 90° from the vertical around an axis transverse to the vehicle. The pivoting movement is followed by downward movement of the rear roof part together with the forward roof part, which is parallel to it, along guide links, one of which is assigned to each outside surface of the car body. A stowing mechanism of this type takes up a considerable amount of space in the longitudinal direction of the vehicle, which limits the design possibilities for the vehicle.

In addition, a second drive element for actuating the joint connecting the two roof parts must be provided to telescope the rear roof part and forward roof part into each other, and a third drive element must be provided to slide the forward roof part along a slide rail of the rear roof part. One phase of this movement must be completed before the next can begin. Considerable effort is required to control the process, and a considerable amount of work is also involved in installing the various drive elements required.

SUMMARY OF THE INVENTION

The invention is based on the problem of optimizing a convertible vehicle of the type described above with respect to the amount of space occupied by the roof both when it is stowed and when it is in motion and also with respect to the simplicity of the opening and closing movements.

The control effort is significantly reduced by a design with only a single drive element per vehicle side, which acts both on the rear roof part and also on the roof part in front. The opening or closing movement of the roof can be carried out by actuation of a single, shared drive element, without the need for any additional control elements, over the course of a single, continuous sequence of movements.

The possibility of stowing the roof in an especially space-saving manner is obtained by providing a multi-bar linkage, by means of which the rear roof part can be moved simply by the mutual pivoting of the connecting rods connected to each other in the multi-bar linkage.

The overall movement of the rear roof part thus consists of various individual pivoting movements superimposed on each other, there being no need for a translational component outside the drive element. Especially advantageous although not mandatory is the design of a multi-bar linkage with only one drive element. Via the multi-bar linkage, therefore, the drive element can divide the overall pivoting movement into the individual pivoting movements of the individual connecting rods, and thus divided into components, the roof opening or closing process takes the form of a continuous flow of movements.

If the connection between the rear roof part and the roof part in front of it is also designed as a multi-bar linkage, a measure which is especially advantageous, it is possible for the forward roof part to be stowed by a pure pivoting movement also. It is possible in particular here for the two multi-bar linkages to be connected to each other to form a common multi-joint linkage, so that the movements of the rear roof part and of the forward roof part can be coupled together simply by the multi-bar linkages, without any need for additional control means, etc.

By selection of appropriate dimensions for the various connecting rods in the multi-joint linkage, the rear roof part can be stowed in such a way that it is pivoted only slightly and thus remains, even after stowing, in the nearly upright position which it occupies when the roof is closed and in which it extends only slightly in the longitudinal direction, i.e., in the direction of travel.

By means of the invention, it is also possible to make use of very narrow stowing spaces, so that, for example, a pickup truck can also be designed as a convertible, and the roof parts can be stowed in the narrow space in front of the forward end of the open cargo space.

BRIEF DESCRIPTION OF THE DRAWINGS

Additional advantages and features of the invention can be derived from the following exemplary embodiment of the object of the invention, which is described below and illustrated in the drawing.

DESCRIPTION OF THE PREFERRED EMBODIMENTS

Figure 1A:
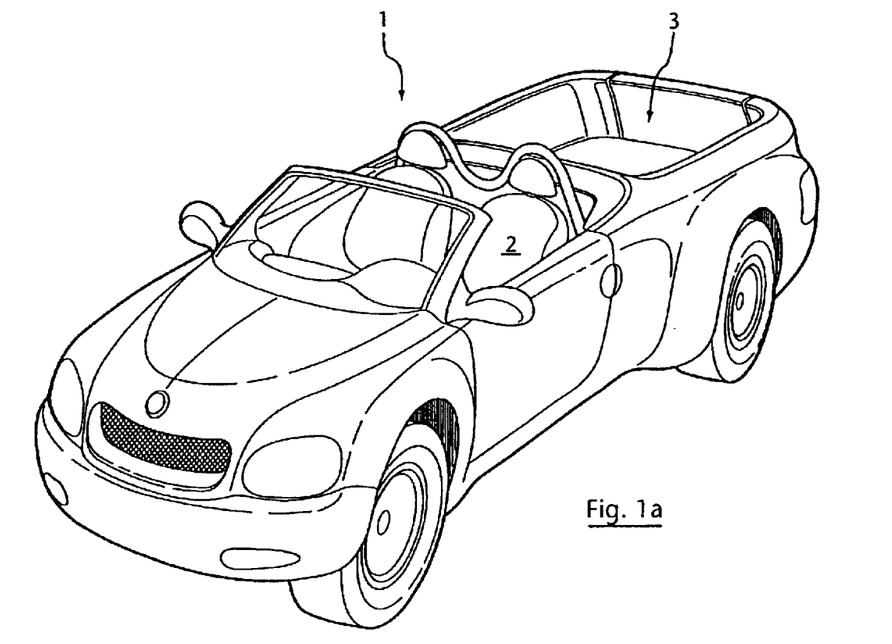
FIG. 1a shows a perspective view, from the front, of a convertible vehicle according to the invention, which is designed as a pickup truck, with the roof open.
Figure 1B:
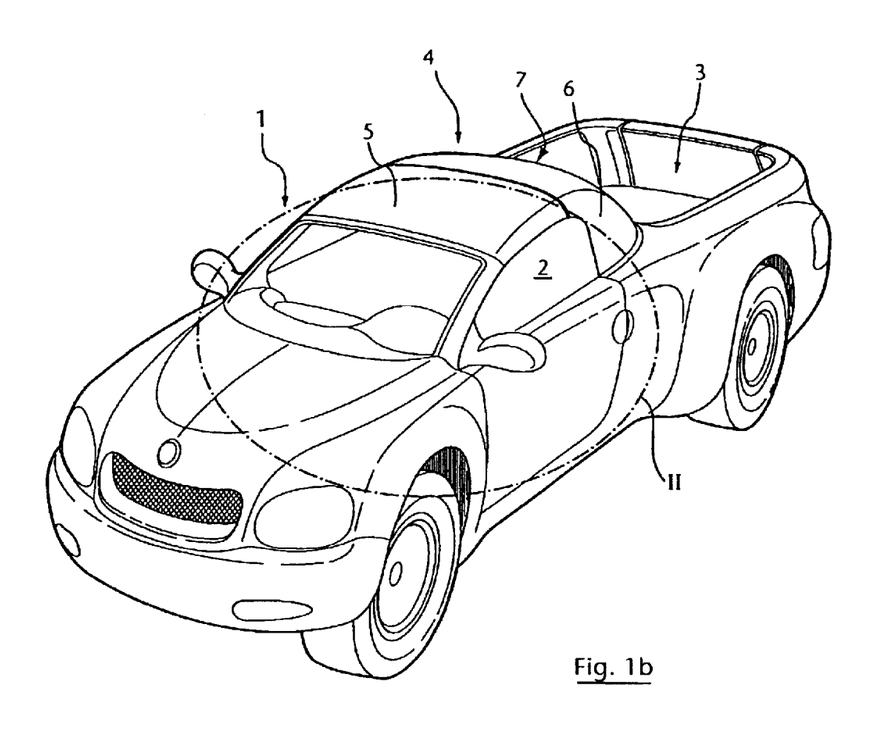
FIG. 1b shows the vehicle according to FIG. 1 with the roof closed.
Figure 2:
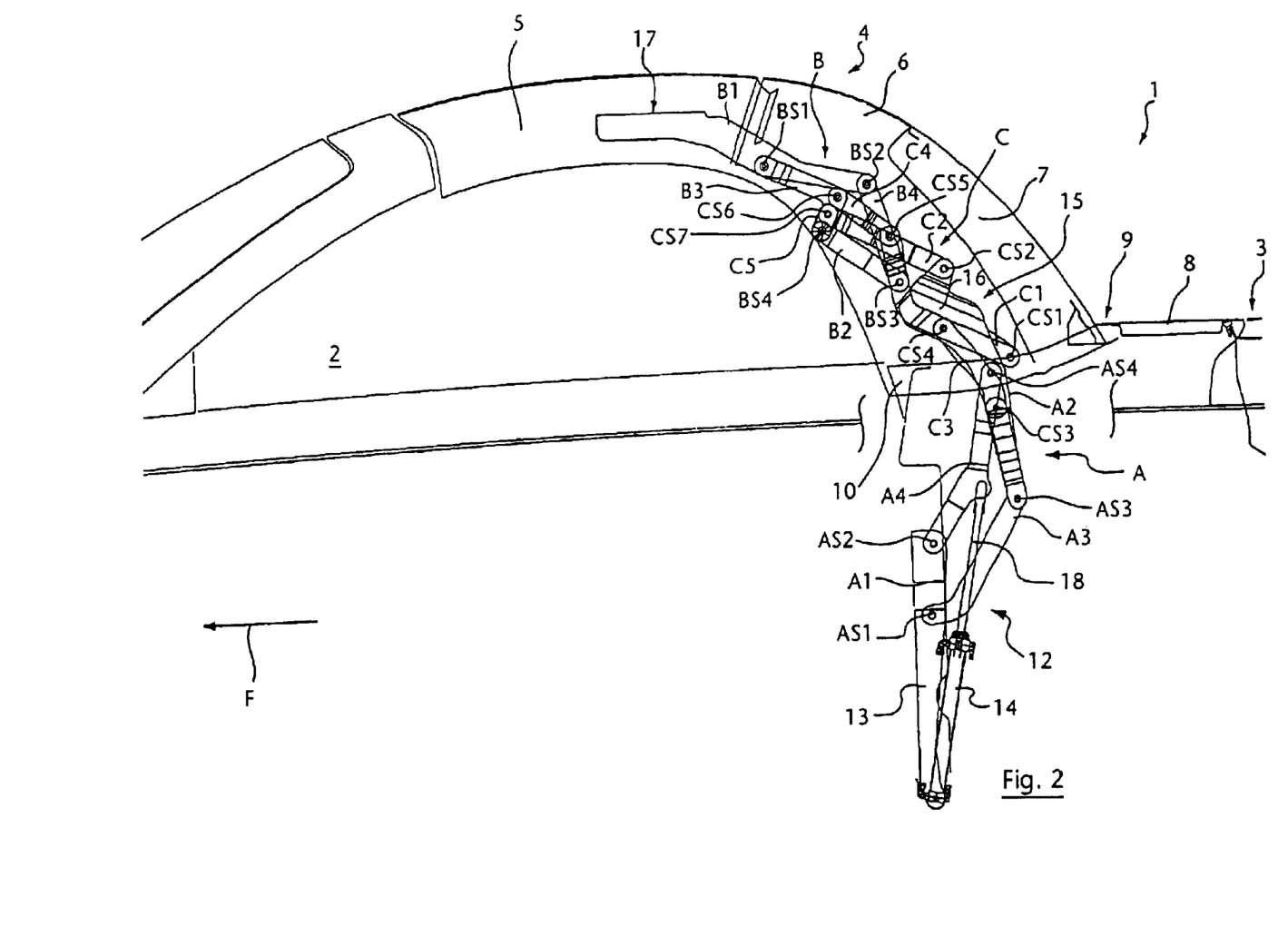
FIG. 2 shows a section of the vehicle corresponding essentially to area II in FIG. 1b, with the roof closed.
Figure 3:
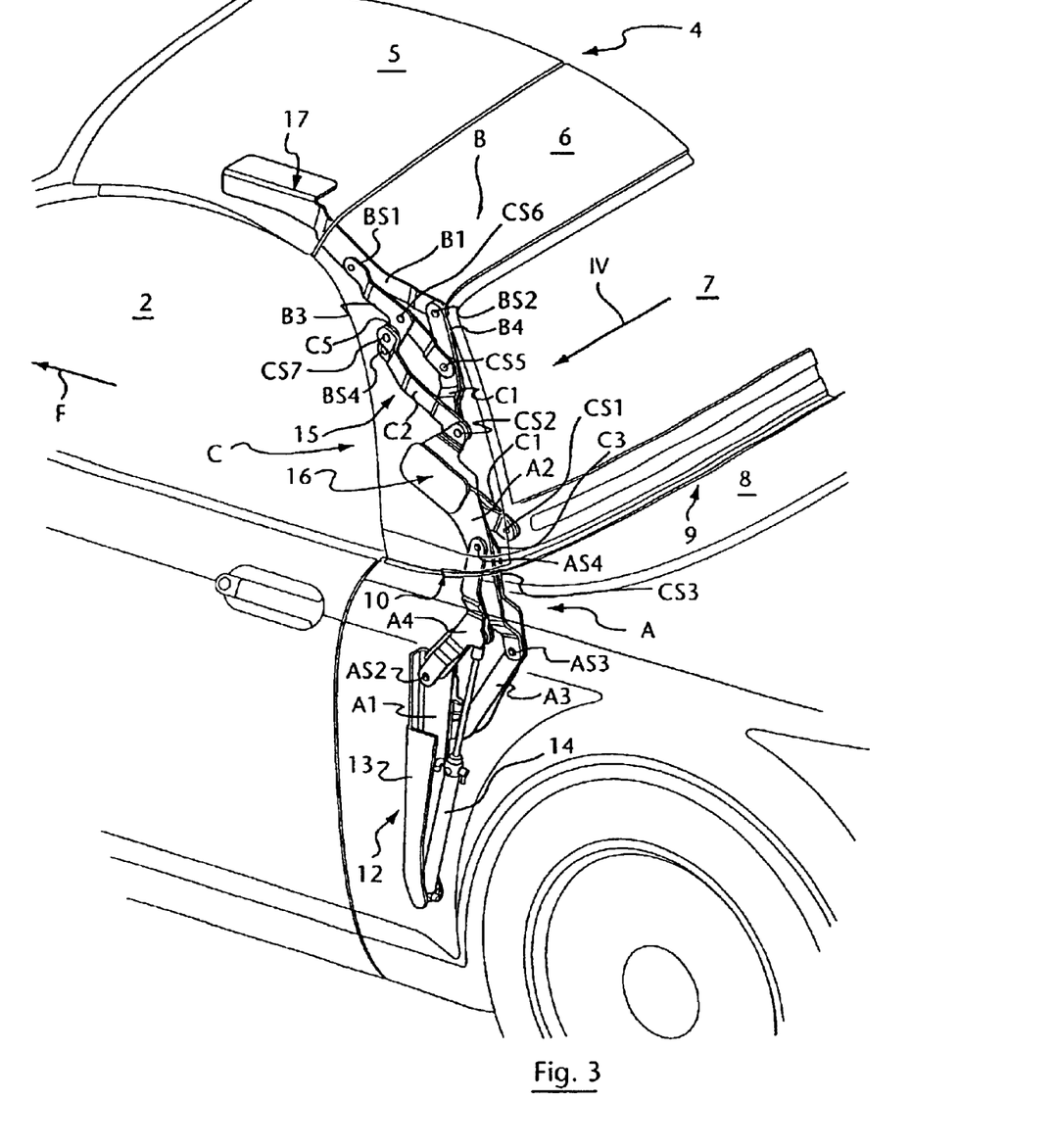
FIG. 3 shows a perspective view, looking at an angle from the left rear, of the roof area of the vehicle according to FIG. 2.
Figure 4:
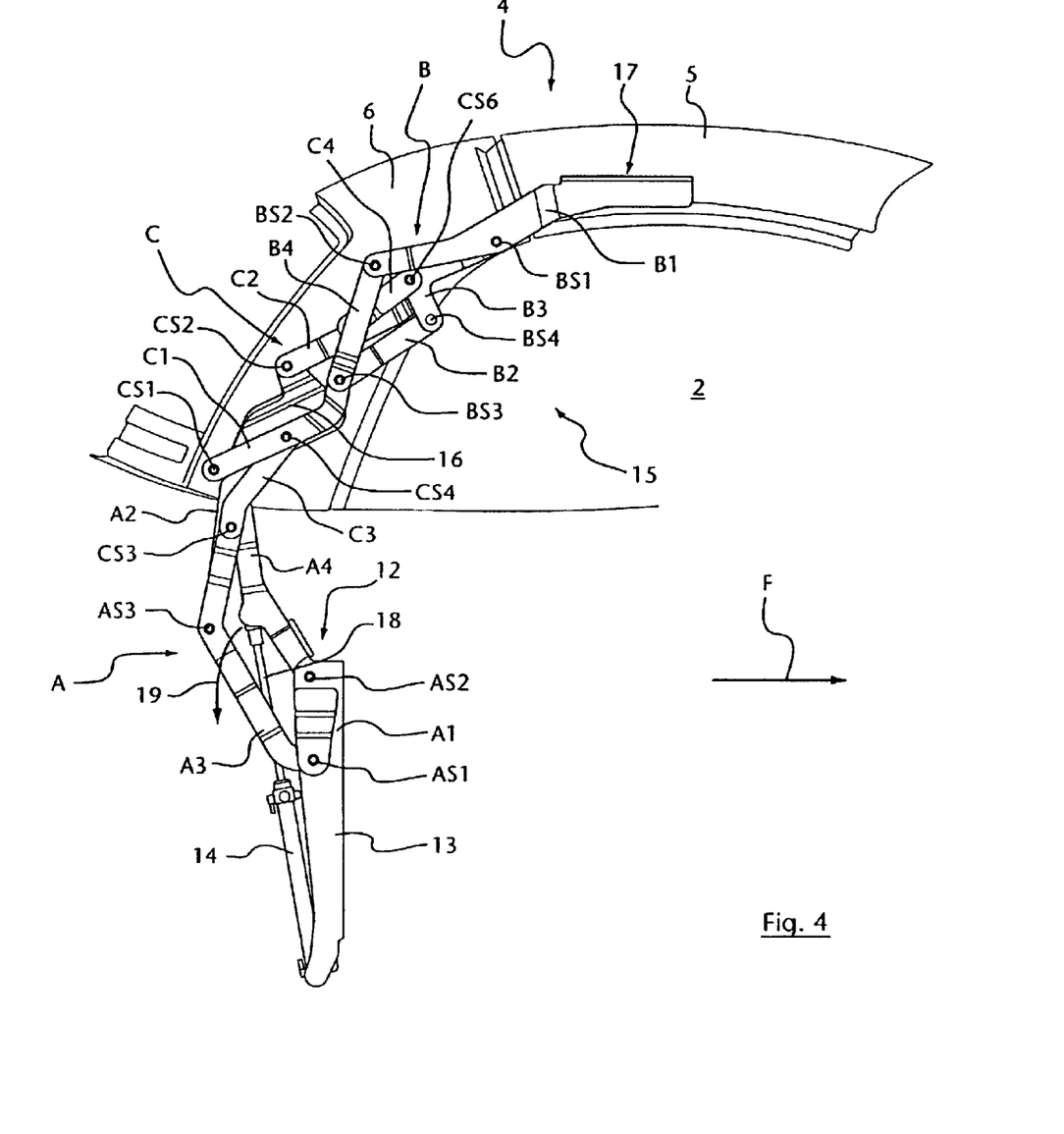
FIG. 4 shows a view looking in direction IV of FIG. 3 of the roof and its drive mechanism in the closed position according to FIG. 2.
Figure 5:
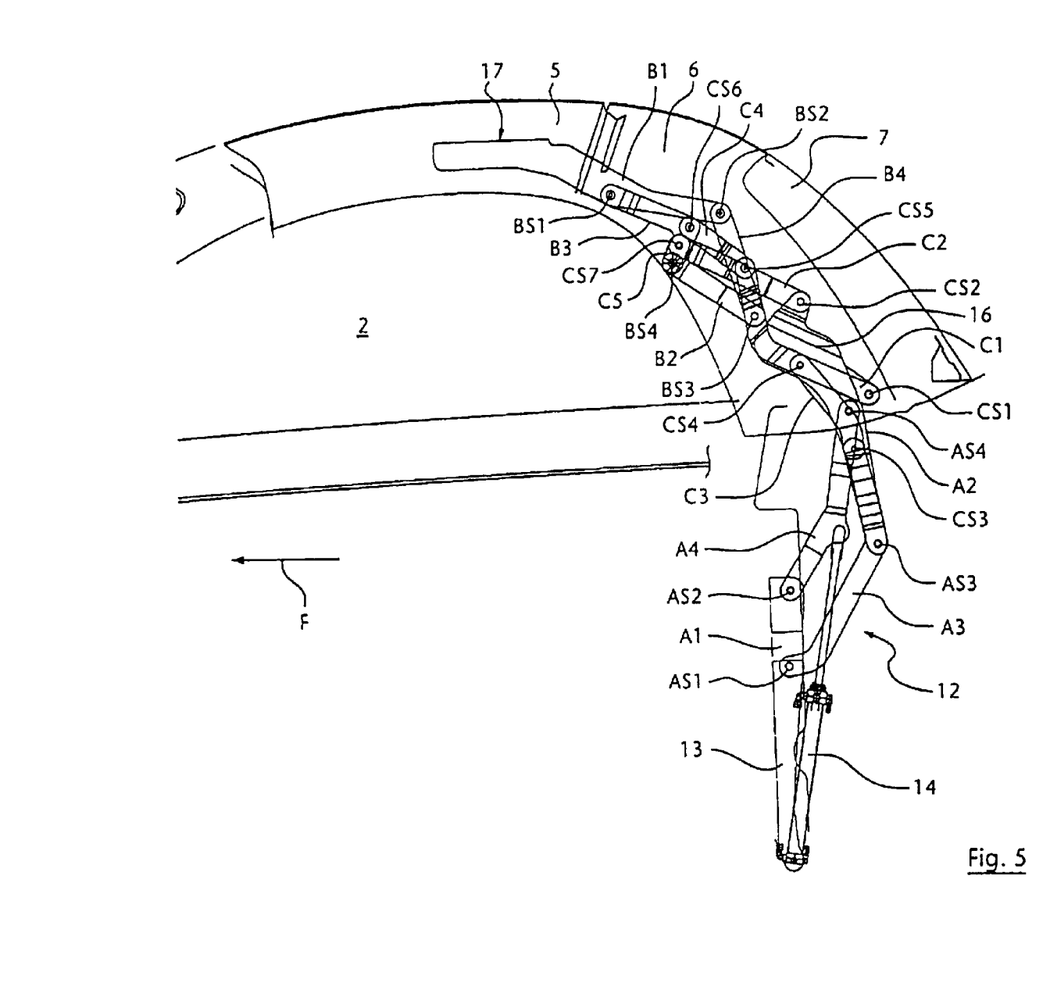
FIG. 5 shows a view similar to that of FIG. 2 with the roof closed but with the canopy box cover already open.

The convertible vehicle 1 according to FIG. 1 is designed as a so-called pickup; that is, a driver's compartment 2 is provided in forward area of the vehicle, which can be provided with one or more rows or seats. In the rear part of the vehicle, an open, load-carrying surface 3 is provided.

In the present exemplary embodiment, the convertible vehicle 1 has a roof 4 with two solid roof parts 5, 6. With respect to the direction of travel F, the roof part 5 is located in front of the roof part 6, which is at the rear and which also includes the rear window. Instead of two solid roof parts 5, 6 as shown here, it is also possible to provide a different number of parts. Nor is it mandatory for a roof design such as that shown here to be used in a pickup truck.

Behind the closed roof 4, according to the exemplary embodiment illustrated here, there is a pivoting canopy box cover 8, the middle part of the forward edge 9 of which adjoins the rear area of the rear roof part 6 and can be opened when the roof 4 is to be closed. The sidepieces 10 of the canopy box cover 8 at the sides extend farther forward than the forward edge 9 in the middle.

In the closed position (FIGS. 1–6) of the roof 4, the rear roof part 6 is essentially upright, whereas the forward roof part 5 is essentially horizontal and extends the roof 4 in the direction of travel F toward the frame of the windscreen.

The roof 4 is held overall with freedom of movement by a main support 12, which is attached firmly to the car body. For this purpose, the main support 12 on each side of the vehicle includes a support bracket 13, attached solidly to the car body, on which a drive element 14, designed here as a hydraulic cylinder, is mounted.

In this case exactly one drive is provided for each side of the vehicle, by means of which both the rear roof part 6 and the roof part 5 in front can be moved jointly.

For this purpose, the drive 14 in question is in working connection by way of a multi-joint linkage 15 with the rear roof part 6 and also with the roof part 5 in front. For the connection with the rear roof part 6, a plate body 16 is provided, which is attached to the multi-joint linkage 15. To establish the connection with the roof part 5 in front, an angled plate body 17 is provided. The plate bodies 16, 17 can be welded, for example, or bonded, or screwed to the roof parts 6, 5. Other fastening methods can also be considered. Nor is it mandatory that plate bodies be used. Thus other types of connecting elements for the roof parts 5, 6 are also possible.

It is not mandatory that both roof parts 5, 6 be in working connection with the drive 14 by way of a common multi-joint linkage 15. Instead, it is also possible for only the rear roof part 6 to be in working connection with the drive 14 by means of interconnected connecting rods 15.

In the exemplary embodiment, the multi-joint linkage 15 couples the movements of the roof parts 5 and 6; both parts are attached to this multi-joint linkage 15.

The multi-joint linkage 15 comprises, in detail, a lower four-bar linkage A, an upper four-bar linkage B, and a synchronizing linkage C, which connects the two four-bar linkages A and B together. It is not mandatory for the multi-bar linkages A and B to be designed as four-bar linkages, as shown in the present case. In any case, however, the linkages consist of multiple bars.

The four-bar linkage A, which connects the rear roof part 6 to the drive 14, is formed by a part A1 of the support bracket 13 and an opposite connecting rod A2, which is firmly connected to the connecting plate 16 attached to the rear roof part 6 or is designed as an integral part of the connecting plate. Parts A1 and A2 are connected to each other by connecting rods A3 and A4, and work together to form overall a linkage parallelogram with the swivel axes AS1, AS2, AS3, and AS4.

The upper four-bar linkage B, which connects the forward roof part 5 to the synchronizing linkage C, is formed by a first connecting rod B1, which is permanently connected to the angled connecting plate 17, which is attached to the forward roof part 5 or is made as a integral part of the connecting plate. Opposite this rod is another connecting rod B2. Connecting rods B1 and B2 are connected to each other by additional rods B3 and B4 to form a four-bar linkage and work together to form overall a linkage parallelogram with the swivel axes BS1, BS2, BS3, and BS4.

The four-bar linkages A and B are connected to each other by a synchronizing linkage C, so that the force applied by the drive element 14 to the connecting rod A4 can be transmitted to the overall linkage 15 and thus to the roof parts 5, 6 attached to it.

The synchronizing linkage C comprises a lower main lever Cl and an upper main lever C2, which, when the roof 4 is closed, are almost parallel to each other, and both are attached in swiveling fashion to extensions of the connecting plate 16 at the bearing points CS1 and CS2.

The lower main lever is connected by a push-pull lever C3, which is supported in a swiveling manner at the support point CS3, to an extension of the rod A3 assigned to the lower four-bar linkage A. The pull lever C3 acts on the main lever C1 via the joint CS4 of the main lever C1, which is a certain distance away from the other joint CS1 of the main lever C1. Introducing a force via the rod C3 can therefore cause the main lever C1 to swiveled around its joint CS1.

At the free end of the main connecting rod C1 pointing away from the joint CS1, this rod is connected by way of a swivel joint CS5 to another push-pull lever C4, which for its own part extends from this joint CS5 all the way to the angled rod B3 of the upper four-bar linkage and acts on this rod at the joint CS6.

The upper main connecting rod C2 is connected by a joint CS7 to the connecting rod B2 of the upper four-bar linkage B. This rod B2 has a long sidepiece, which extends between the swivel joints BS3 and BS4; the swivel joint BS4 establishes the connection between the connecting rods B2 and B3. In addition, the rod B2 also has a short sidepiece, designated C5, which connects the swivel joint BS4 to the swivel joint CS7 connecting the rods B2 and C2. In the diagram according to FIG. 2, the swivel joint CS7 is in front of the connecting rod B3 but is not connected directly to it; instead, the connection is established by way of the pivot joint BS4. By means of the push-pull lever C4, therefore, torque can be exerted on the angled rod B3 around the joint BS4, so that the force exerted by the pull lever C4 cause the upper four-bar linkage B to open or close.

The upper and lower multi-bar linkages B and A and the synchronizing linkage C located between them cooperate to form overall a multi-joint linkage 15, the connecting rods of which are all connected to each other merely by swivel joints; there is no need for any translational movement such as that which might occur in a guide link. The overall swiveling movement of the roof 4 is brought about solely by the swiveling of the individual connecting rods forming part of the multi-joint linkage 15 with respect to each other. Because of the mediating role of the synchronizing linkage C, only a single drive 14 per side is sufficient for actuation. It would also be possible to provide a central drive, which acts synchronously in the same way on each side of the vehicle by way of, for example, direction-changing gears. As a result, only one drive unit would then be necessary, but this one unit would still be able to exert the required force in the same way on both sides of the vehicle in a synchronous manner.

To open the roof 4 from its closed position, a pulling force is exerted on the piston rod 18 of the drive 14. By way of its joint with the connecting rod A4 of the lower four-bar linkage A, this force is transmitted to the four-bar linkage in such a way that the connecting rod A4 is swiveled in the direction of the arrow 19 around the swivel joint AS2. As this occurs, the lower four-bar linkage A is opened, as a result of which the connecting rod A2, which is rigidly connected to the rear roof part 6 by the connecting element 16, is moved downward; corresponding to the nearly fully formed linkage parallelogram A, the movement is essentially a vertical stroke, upon which only a slight pivot angle is superimposed.

As a result of the downward movement of the connecting rod A3, the push-pull lever C3, which is connected to it at the joint CS3, is also moved downward, as a result of which the forward end (with respect to the travel direction F) of the main lever C1 of the synchronizing linkage C is moved downward with respect to the support point of the linkage on the rear roof part 6. At the same time that the rear roof part 6 is moving downward, a relative motion of the roof parts 5 and 6 with respect to each other is also occurring as a result. The downward-swiveling movement of the main lever C1 is transmitted via the pull lever C4, which is connected to the free end CS5 of the main lever C1, to the four-bar linkage B. The angled lever B3 is thus swiveled around its support point BS4, by which it is held on another connecting rod B2 of the upper four-bar linkage B, as a result of which the upper four-bar linkage B as a whole is opened, and the forward roof part 5 hinged to this joint via the connecting plate 17 is shifted inward and downward with respect to the rear roof part 6.

As the piston rod 18 of the drive element 14 continues to retract, the lower four-bar linkage A continues to open, as a result of which the downward shift of the rear roof part 6 via the connecting plate 16 between the four-bar linkage A and the rear roof part 6 continues until this roof part 6 is supported in a nearly vertical position underneath the window apron line 20 of the car body. As this is happening, the main lever C1 of the synchronizing linkage C is swiveled further downward by the pull lever C3, as a result of which this main lever swivels the angled lever B3 of the upper four-bar linkage B further downward via the pull lever C4 and thus ensures that there is a ratio between the angle around which the lower roof part 6 swivels and that around which the upper roof part 5 swivels. While these roof parts are at a large angle to each other in the closed position of the roof, the forward roof part 5 being nearly horizontal and the rear roof part 6 being nearly vertical, the fact that the forward lever B3 swivels around an angle of approximately 90° means that the roof parts 5, 6 can therefore both be brought into a vertical position in which they are parallel to each other in the stowed position. Via its joint on the connecting rod B1, which is rigidly connected to the upper roof part 5, the forward lever B3 thus pulls the upper roof part 5 into a position in which it is parallel to the rear roof part 6.

The sequence of movements by which the roof 4 is closed is the same except executed in reverse. The pull levers C3 and C4 act in this case as push levers on the associated four-bar linkages.

Figure 6:
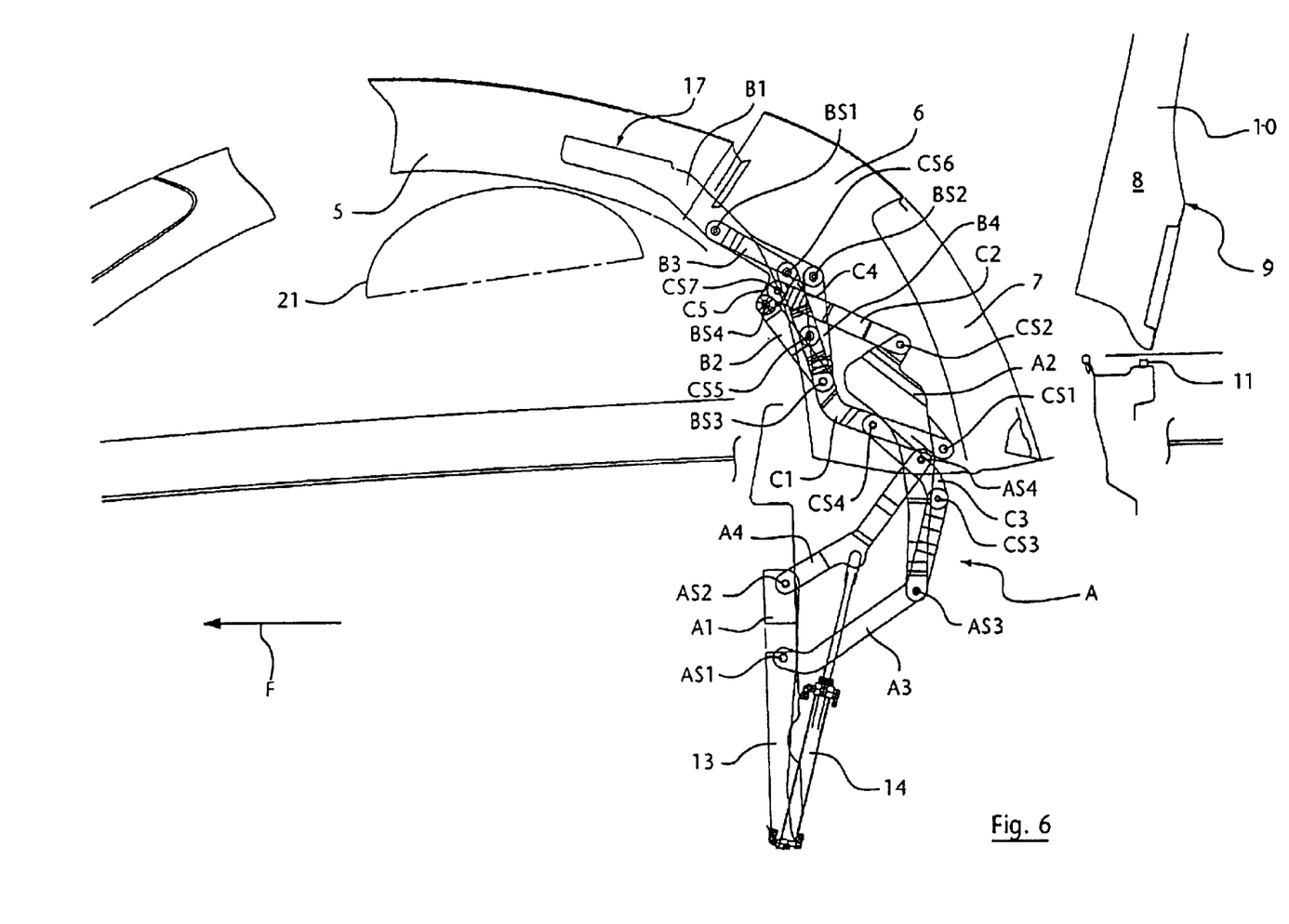
FIG. 6 shows a view similar to that of FIG. 5 while the roof is being opened, where the two roof parts are being moved both relative to each other and also relative to the body of the vehicle.
Figure 7:
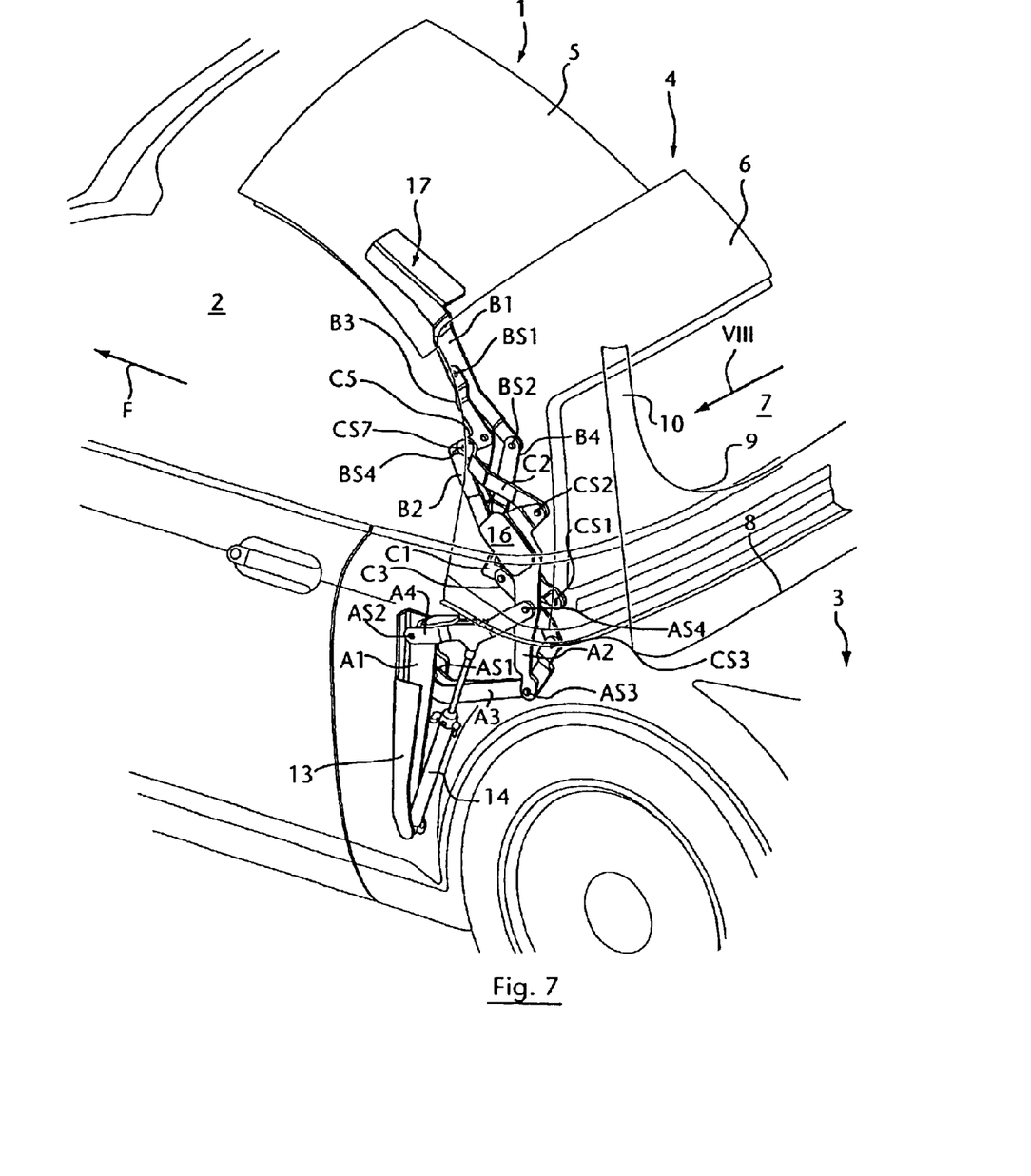
FIG. 7 shows a perspective view looking at an angle from the left rear of the vehicle with the roof open, approximately as shown in FIG. 6.
Figure 8:
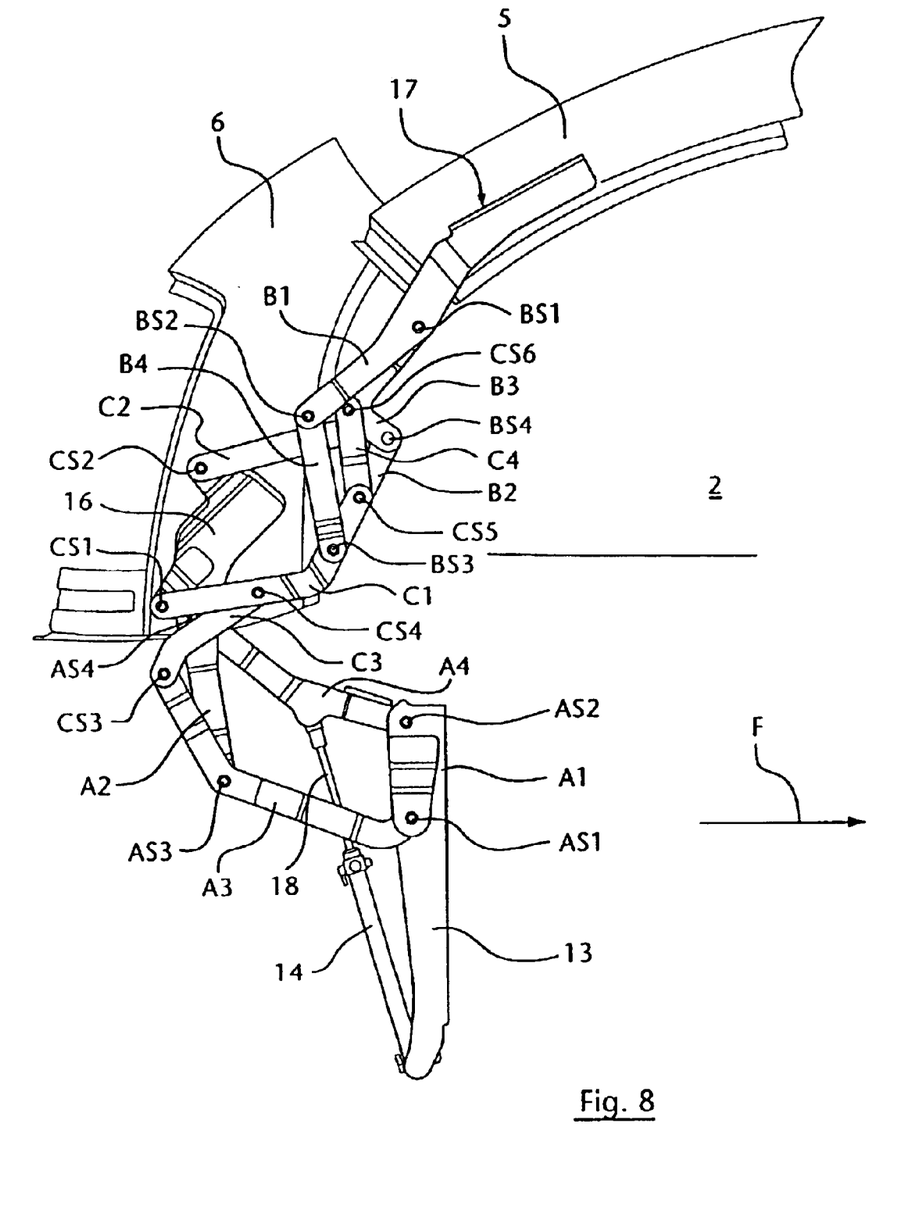
FIG. 8 shows a view looking in the direction of arrow VIII in FIG. 7 at the roof as it is being opened.
Figure 9:
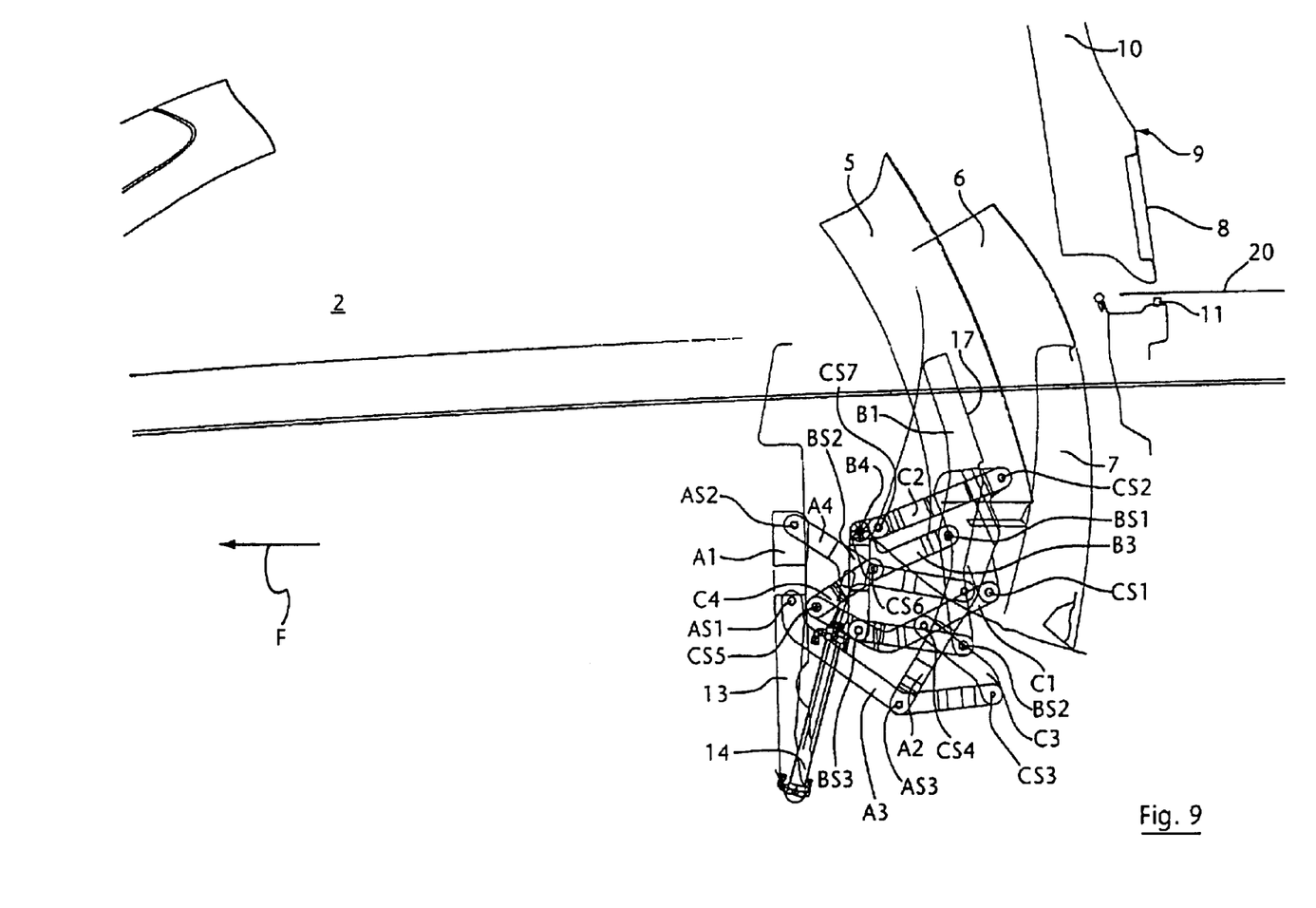
FIG. 9 shows a view similar to that of FIG. 6 as the roof continues to be opened.
Figure 10:
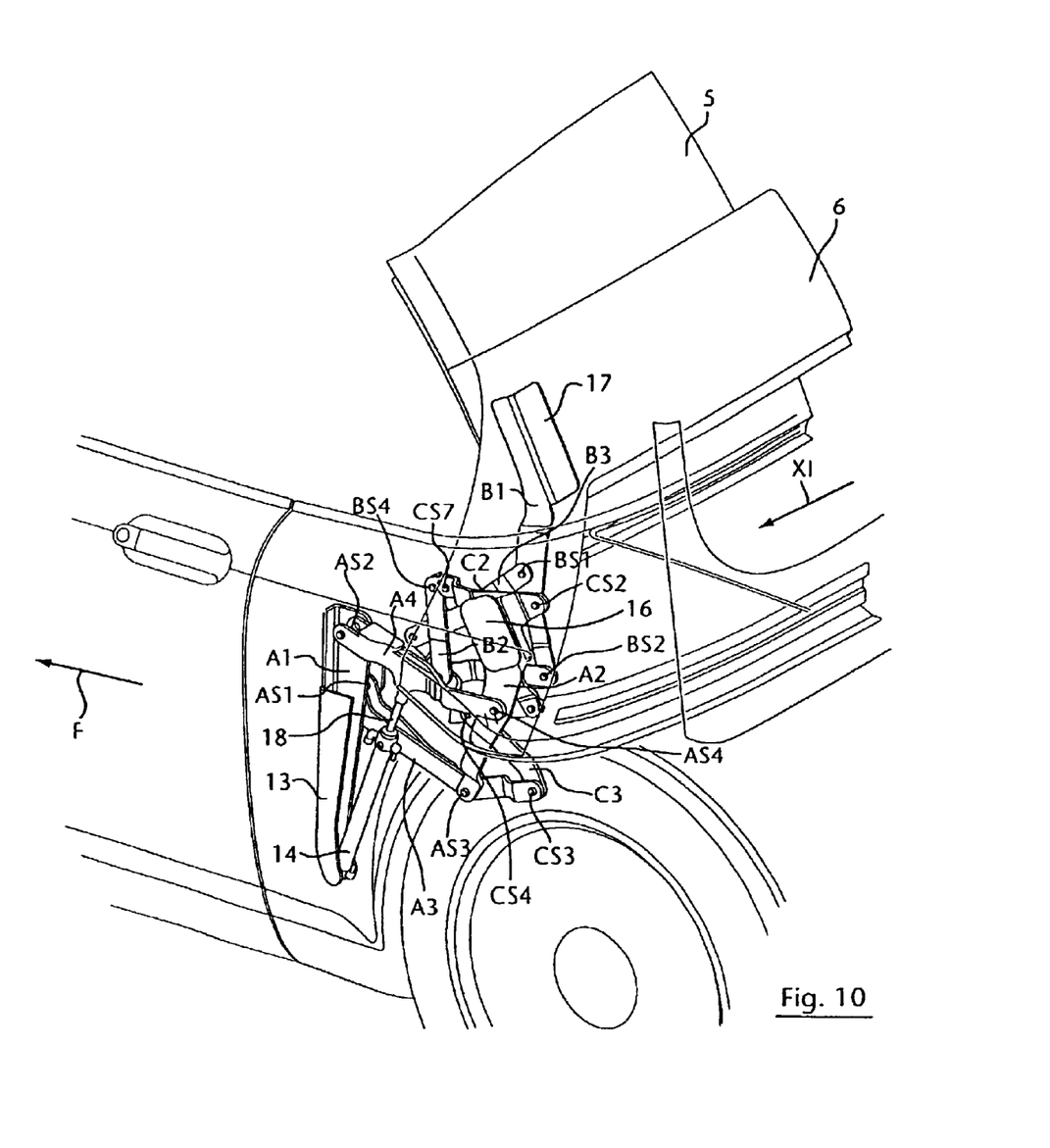
FIG. 10 shows a perspective view looking at an angle from the rear left of the vehicle with the roof open as in FIG. 9.
Figure 11:
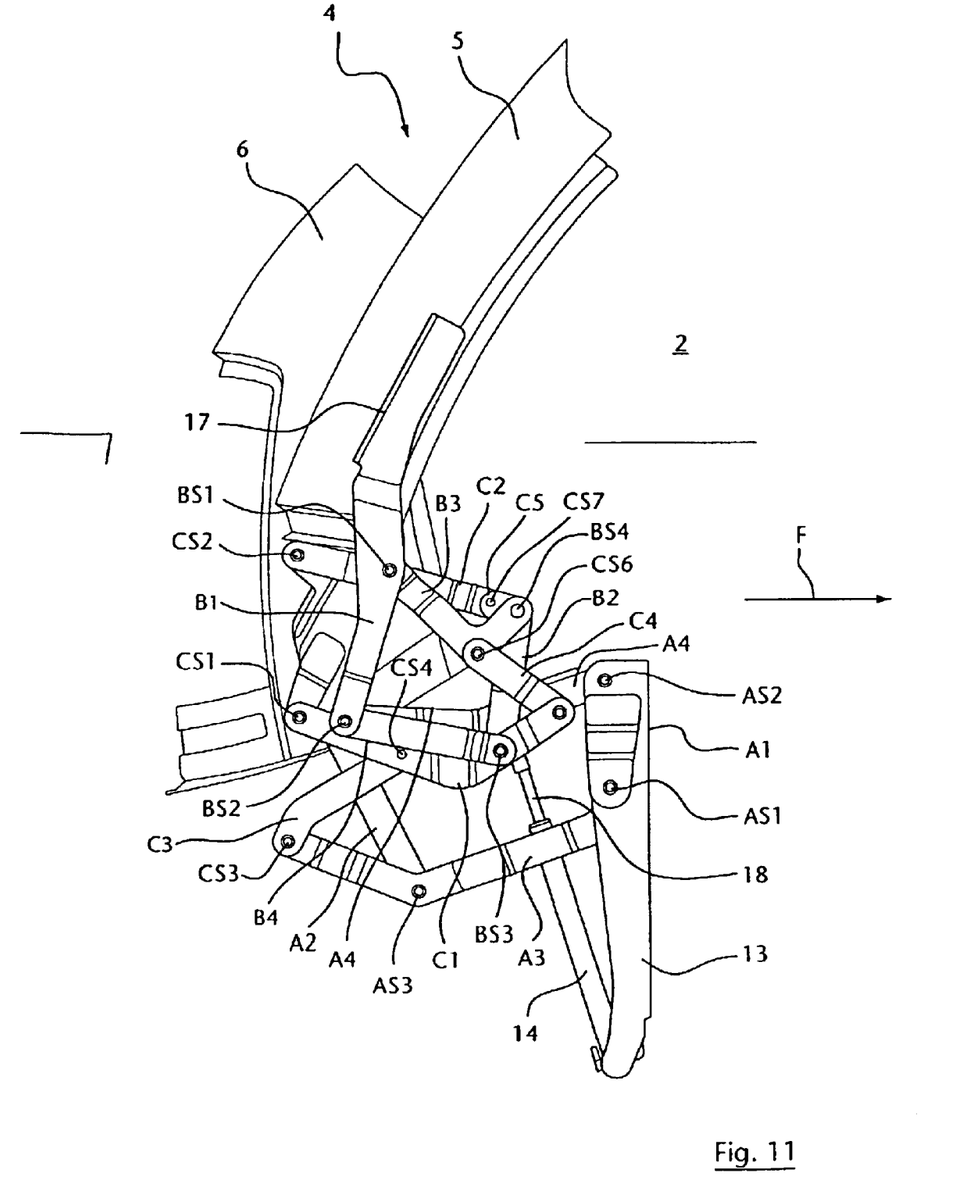
FIG. 11 shows a view of the roof looking in the direction of arrow XI in FIG. 10.
Figure 12:
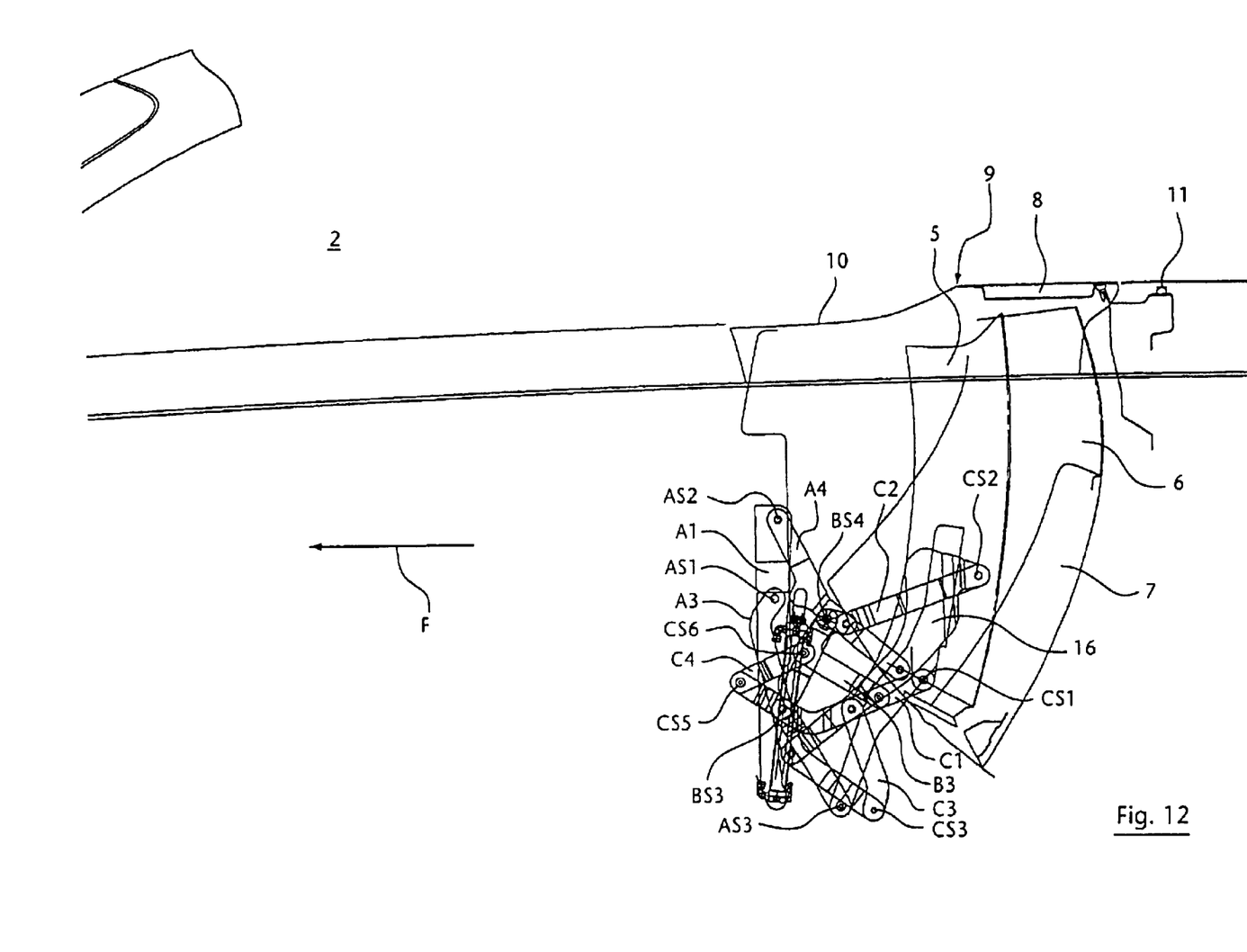
FIG. 12 shows a view similar to that of FIG. 9 after the roof has been completely opened.
Figure 13:
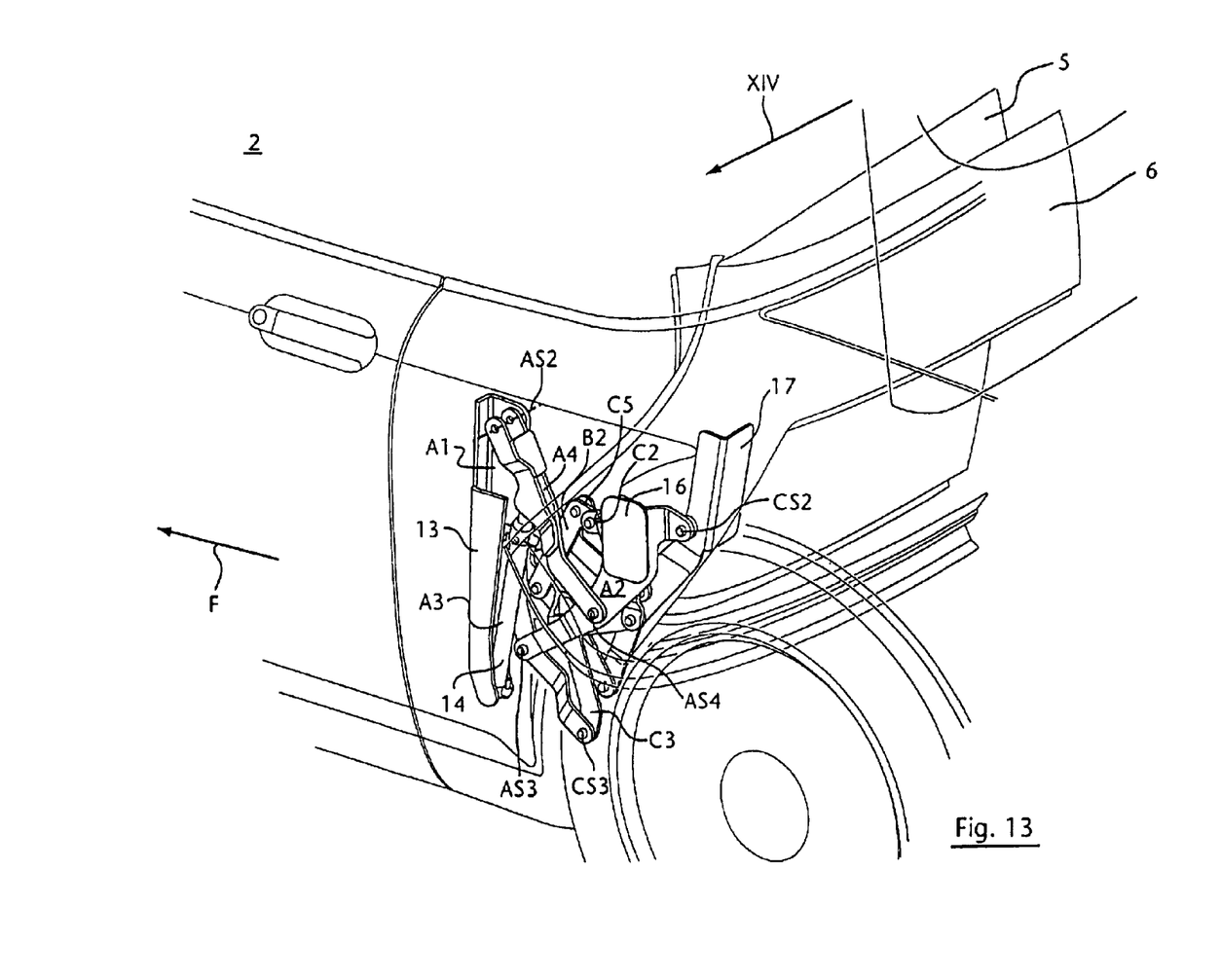
FIG. 13 shows a perspective view of the roof area of the vehicle in the completely opened position according to FIG. 12.
Figure 14:
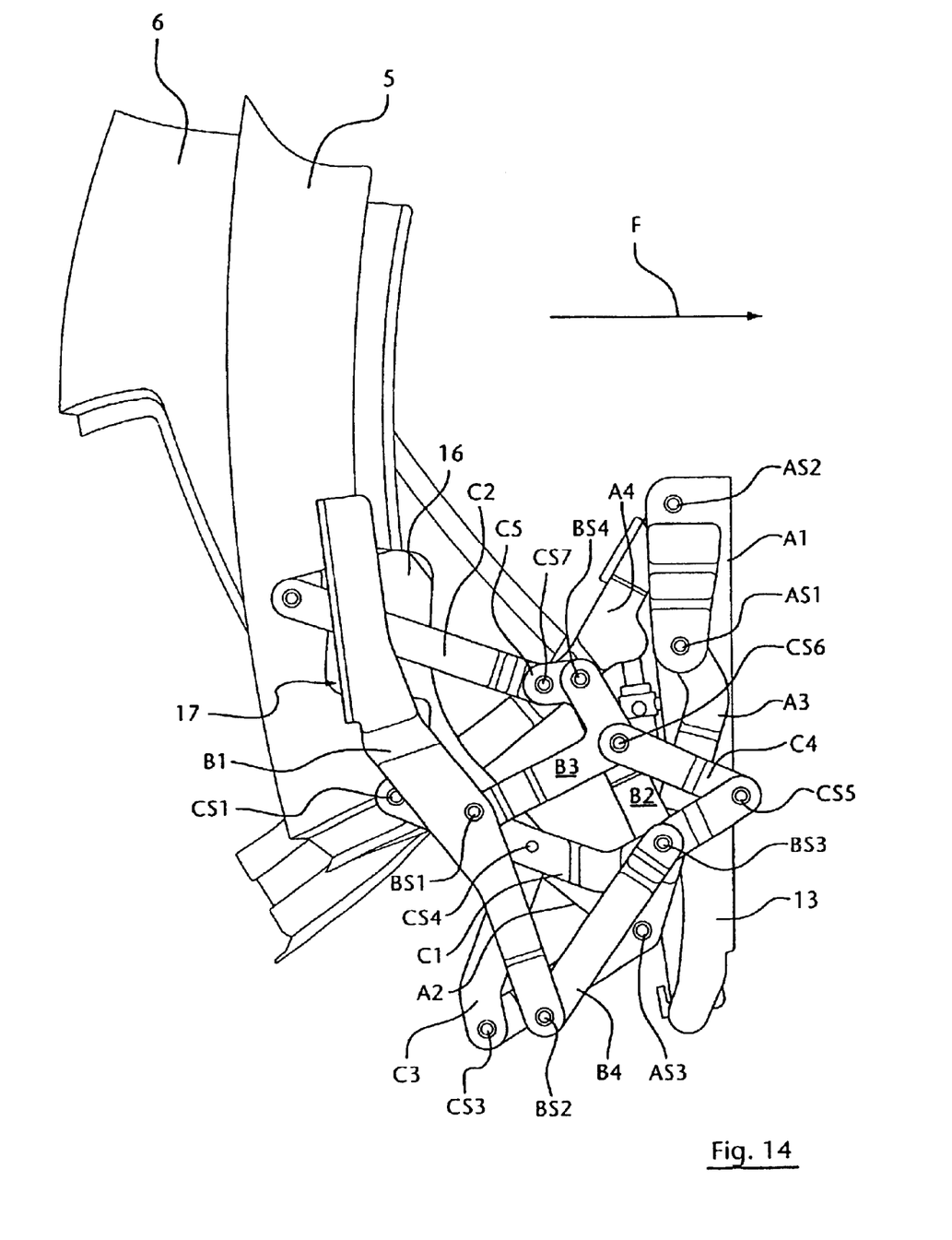
FIG. 14 shows a view looking in the direction of arrow XIV in FIG. 13.

FIG. 6 shows the outline 21 of the head of a so-called "95% man". This makes it clear that, during the entire roof-opening or roof-closing operation, the headroom of the occupants remains fully preserved. Nevertheless, because of the synchronized movements of the roof parts 5, 6 accompanying the opening movement of the complete roof 4, only a limited amount of external height is required during any one phase of the operation. The roof 4 can thus also be opened in low spaces such as garages without the danger that the forward edge of the roof will collide with a low ceiling. This is explained by the fact that the roof parts 5 and 6 begin to telescope into each other at the same time that the rear roof part 6 is being lowered, and thus one of the individual phases does not have to be completed before the next one begins.

What is claimed is:

1. Convertible vehicle (1) with a roof (4) having at least two parts, comprising a rear roof part (6) and a roof part (5) which is in the forward position when the roof is closed, where, when the roof is open, the rear roof part (6) is essentially vertical and the roof part (5) in the forward position with respect to the direction of travel (F) is essentially parallel to the rear part, wherein a single common drive (14), one of which is on each side of the vehicle, is used to move both the rear roof part (6) and the roof part (5) in front to open and close the roof (4).

2. Convertible vehicle (1) with a roof (4) consisting of at least two parts, comprising a rear roof part (6) and a roof part (5) which is in the forward position when the roof is closed, where, when the roof is open, the rear roof part (6) is essentially vertical and the roof part (5) in the forward position with respect to the direction of travel (F) is essentially parallel to the rear part, according to claim 1, wherein, to open or close the roof (4), the rear roof part (6) is in working connection with at least one drive (14) on the side of the car body by way of a linkage of connecting rods (A1; A2; A3; A4) connected in a swiveling manner to each other.

3. Convertible vehicle according to claim 1, wherein the rear roof part (6) is in working connection with the roof part (5) located in front by way of a linkage of connecting rods (B1; B2; B3; B4; C1; C2; C3; C4; C5), which are connected in a swiveling manner to each other.

4. Convertible vehicle according to claim 1, wherein the multi-bar linkage which connects the rear roof part (6) to the drive (14) and the second multi-bar linkage which connects the roof part (5) in front to the rear roof part (6) are designed as a common multi-bar linkage (15).

5. Convertible vehicle according to claim 4, wherein the multi-bar linkage comprises an upper multi-bar linkage (B), which is connected at one end to the roof part (5) in front, and a lower multi-bar linkage (A), which is connected at one end to the rear roof part (6).

6. Convertible vehicle according to claim 5, characterized in that a synchronizing linkage (C) is installed between the upper (B) and the lower (A) multi-bar linkages.

7. Convertible vehicle according to claim 1, wherein, as the rear roof part (6) is being opened or closed, it moves essentially in the vertical direction and is tilted by an angle of less than 30° with respect to a vertical plane transverse to the convertible vehicle.

8. Convertible vehicle according to claim 5, wherein the upper multi-bar linkage (B) and the lower multi-bar linkage (A) are each designed as four-bar linkages.

9. Convertible vehicle according to claim 8, wherein the lower four-bar linkage (A) forms a linkage parallelogram, for which two hinge points (AS1; AS2), one of which is situated essentially vertically above the other, are attached permanently to the car body, and two additional hinge points (AS3; AS4), one of which is again situated essentially vertically above the other, are attached to the rear roof part (6).

10. Convertible vehicle according to claim 8 or claim 9, wherein the upper four-bar linkage (B) forms a linkage parallelogram, for which two hinge points (BS1; BS2) are assigned to the roof part (5) in front and two additional hinge points (BS3; BS4) are assigned to the synchronizing linkage (C).

11. Convertible vehicle according to claim 1, wherein, to open the roof (4), the rear part (6) and the part (5) in front can be telescoped into each other while the rear roof part (6) is being opened.

12. Pickup vehicle (1) with a driver's compartment (2) and a cargo space (3) with a boundary wall between it and the driver's compartment at the forward end of the cargo space with respect to the direction of travel (F), wherein the driver's compartment (2) has a multi-part movable roof (4), which, after being opened, can be stowed so that the roof parts (5; 6) forming the outside surface of the roof assume an essentially vertical or nearly vertical position in front of the forward boundary wall of the cargo space (3), where the roof parts (5; 6) are connected to each other and to a drive element (14) by at least one multi-joint linkage (15).

* * * * *